United States Patent
Wang et al.

(10) Patent No.: US 11,032,071 B2
(45) Date of Patent: Jun. 8, 2021

(54) SECURE AND VERIFIABLE DATA ACCESS LOGGING SYSTEM

(71) Applicant: Microsoft Technology Licensing, LLC, Redmond, WA (US)

(72) Inventors: Bing Wang, Mountain View, CA (US); Neil Scott Davenport, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 241 days.

(21) Appl. No.: 16/369,335

(22) Filed: Mar. 29, 2019

(65) Prior Publication Data

US 2020/0313878 A1    Oct. 1, 2020

(51) Int. Cl.

| | | |
|---|---|---|
| *H04L 9/08* | (2006.01) | |
| *G06F 21/62* | (2013.01) | |
| *G06F 16/17* | (2019.01) | |
| *H04L 29/06* | (2006.01) | |
| *H04L 9/32* | (2006.01) | |

(52) U.S. Cl.
CPC ........ *H04L 9/0847* (2013.01); *G06F 16/1734* (2019.01); *G06F 21/6218* (2013.01); *H04L 9/3213* (2013.01); *H04L 63/10* (2013.01)

(58) Field of Classification Search
CPC ..... H04L 9/0847; H04L 63/10; H04L 9/3213; H04L 9/3073; G06F 21/6218; G06F 16/1734; G06F 16/9014; G06F 16/9027; G06F 16/958; G06F 21/50
See application file for complete search history.

(56) References Cited

U.S. PATENT DOCUMENTS

| | | | | |
|---|---|---|---|---|
| 6,651,099 B1 * | 11/2003 | Dietz | ................... | H04L 43/026 709/224 |
| 8,751,793 B2 * | 6/2014 | Ginter | ................... | G07F 9/026 713/156 |
| 8,843,997 B1 * | 9/2014 | Hare | ................... | H04L 63/0815 726/3 |
| 2015/0039719 A1 * | 2/2015 | Berk | ................... | H04L 67/1097 709/217 |
| 2015/0135300 A1 * | 5/2015 | Ford | ................... | H04L 63/0281 726/11 |
| 2017/0076306 A1 * | 3/2017 | Snider | ................... | H04W 4/029 |
| 2019/0318122 A1 * | 10/2019 | Hockey | ............... | G06F 21/6245 |
| 2019/0327292 A1 * | 10/2019 | Ziebell | ................... | H04L 67/20 |

(Continued)

*Primary Examiner* — Matthew Smithers
(74) *Attorney, Agent, or Firm* — Hickman Becker Bingham Ledesma LLP

(57) ABSTRACT

Techniques for providing a secure and verifiable data access logging system are disclosed herein. In some embodiments, a computer system receives an indication of a data request from a client device that is requesting data of one or more users from a data server, stores a request log entry corresponding to the data request in a log file, generates a request token based on the received indication of the data request, transmits the generated request token to the client device, receives a fetch event from the data server that requests a request digest corresponding to the request token and configured to indicate that the request log entry corresponding to the data request is stored in the log file, stores a response log entry corresponding to the received fetch event in the log file, and transmits the request digest to the data server based on the received fetch event.

20 Claims, 9 Drawing Sheets

(56) References Cited

U.S. PATENT DOCUMENTS

2019/0354607 A1* 11/2019 Snow ................... H04L 67/22
2020/0007311 A1* 1/2020 Oberhofer ............ H04L 63/08
2020/0204545 A1* 6/2020 Pacella ................. G06F 21/32

* cited by examiner

SECURE AND VERIFIABLE DATA ACCESS LOGGING SYSTEM

TECHNICAL FIELD

The present application relates generally to systems, methods, and computer program products for implementing a secure and verifiable data access logging system.

BACKGROUND

Internet users are becoming more cognizant of how their personal data is being used in online services such as social networks. Often once personal data, such as user behavior (e.g., user browsing behavior), is collected, how that data is used and processed is opaque and amorphous for the user. This results in a real or perceived lack of data control for the user, who in turn may believe their privacy is compromised by the arrangement. State of the art machine learning algorithms utilize large amounts of personal data to help provide more personalized online services, such as recommendations of online content or personal news feeds, and this level of personalization has come to be expected even by casual users of online services. As a result, users often face a difficult dilemma between enjoying the benefits of modern data science and being assured that data collectors and service providers are using their data appropriately. Many Internet users are willing to exchange their personal data for a clear exchange of value only to trusted parties. Winning the trust of consumers has therefore become an important organizational imperative for companies running online services. Given the magnitude and frequency of public scandals involving personal data, it is clear that there is still a significant gap in trust between Internet users and Internet data collectors and service providers. This is in part due to the black box nature of most online services where users cannot know how their data is utilized nor have the ability to review the usage of their data. Current solutions for providing secure and audible systems involve adopting new tools or hardware that is burdensome on existing system and data infrastructure. Additional technical problems also present a barrier to widespread adoption of the existing solutions.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

I. Overview

Figure 1:
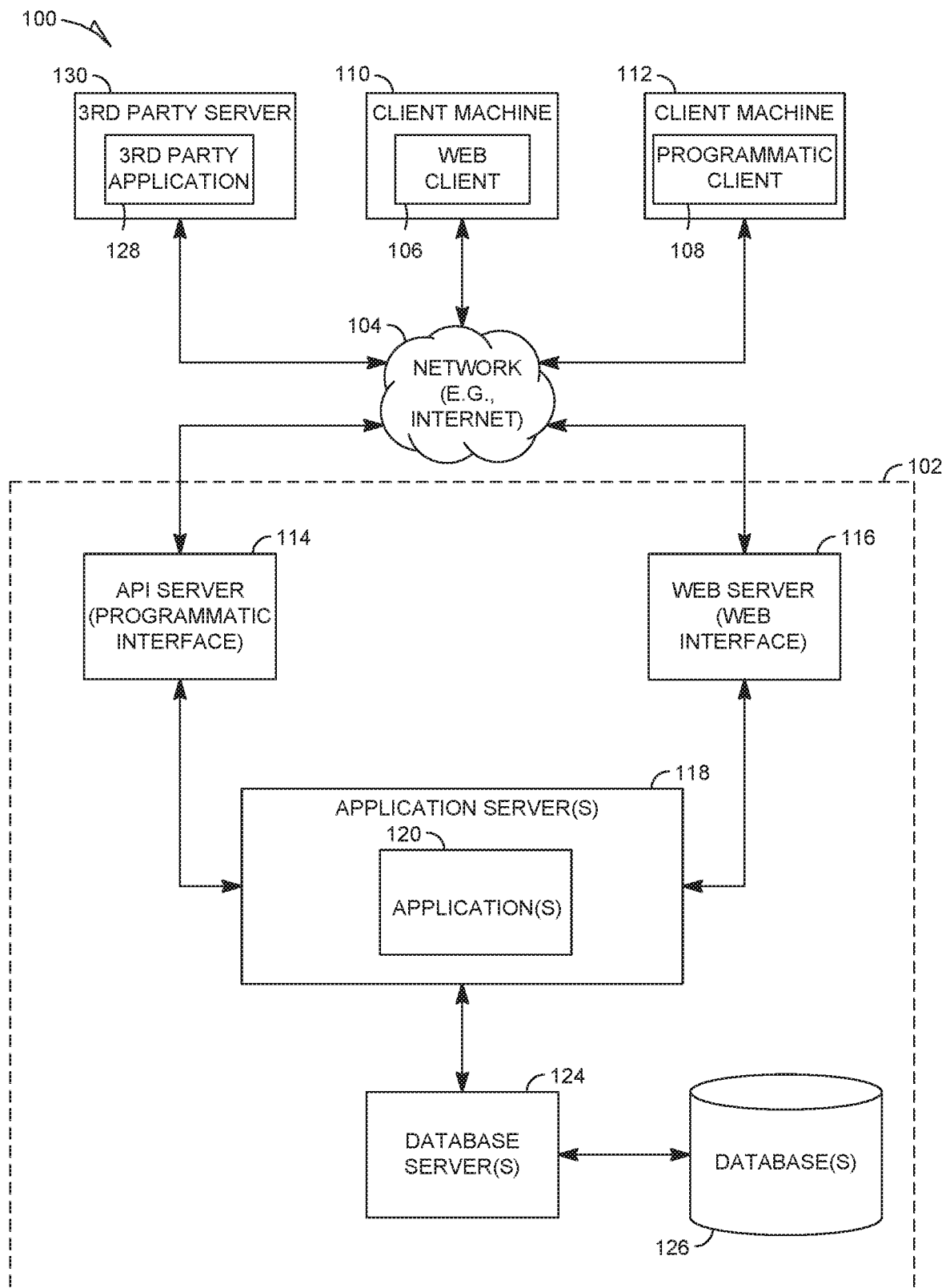
FIG. 1 is a block diagram illustrating a client-server system, in accordance with an example embodiment.

Example methods and systems of implementing a secure and verifiable data access logging system are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. In some example embodiments, a logging system of the present disclosure requires each data access request to a data server, as well as the servicing by the data server of the data access request, to be logged in a way that makes the log auditable and tamper resistant, thereby providing a secure and verifiable data access logging system. Data owners are able to retrieve their corresponding log file information to review the usage of their data in order to verify that the usage aligns with the purposes the data owners consented to in the agreement between them and the online services implementing the data collection and processing. In some example embodiments, the logging system implements an attribute-based encryption mechanism to provide built-in data access control into the stored log information, thereby providing improved access control and protecting the confidentiality of the stored log information.

In some example embodiments, a log server of the logging system stores a request log entry corresponding to a data request from a client device requesting data of one or more users from a data server, as well as a response log entry corresponding to the data server servicing the data request from the client device. The log server may encrypt data of the response log entry using an attribute-based encryption that builds an attribute-based access policy into cyphertext of the encrypted data of the response log entry.

The implementation of the features disclosed herein involves a non-generic, unconventional, and non-routine operation or combination of operations. By applying one or more of the solutions disclosed herein, some technical effects of the system and method of the present disclosure are to provide a specially configured data access logging system that provides a secure and reliable logging system that improves user data protection by providing auditability of member data usage traces and that can be incorporated into an existing data service infrastructure without having to adopt new tools or hardware that are burdensome on the existing infrastructure. As a result, the functioning of the computer system is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
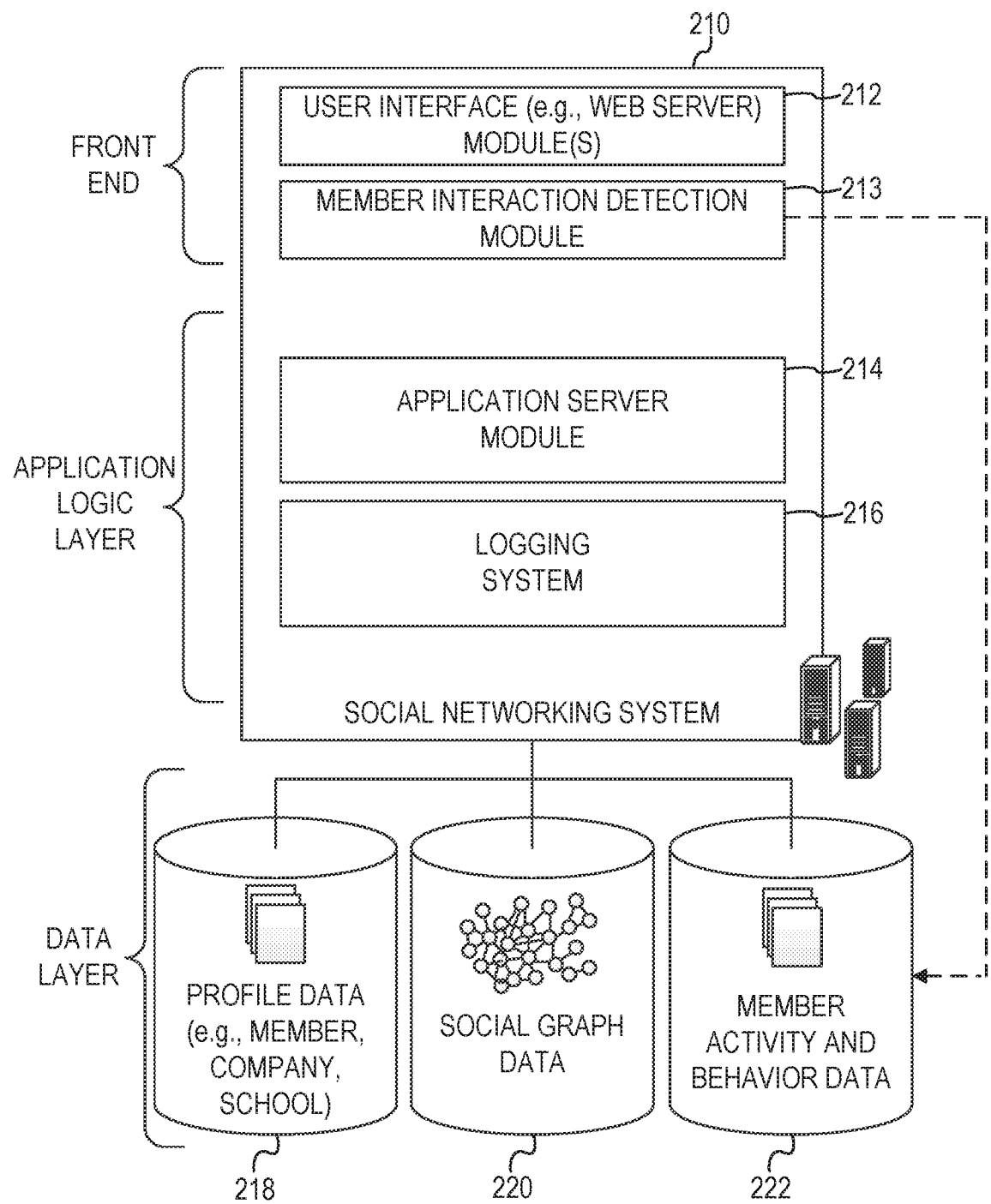
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a logging system 216, for use in social networking system 210, consistent with some embodiments of the present disclosure. In some embodiments, the logging system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the logging system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family, members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority, level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the logging system 216. The members' interactions and behavior may also be tracked, stored, and used by the logging system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the logging system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
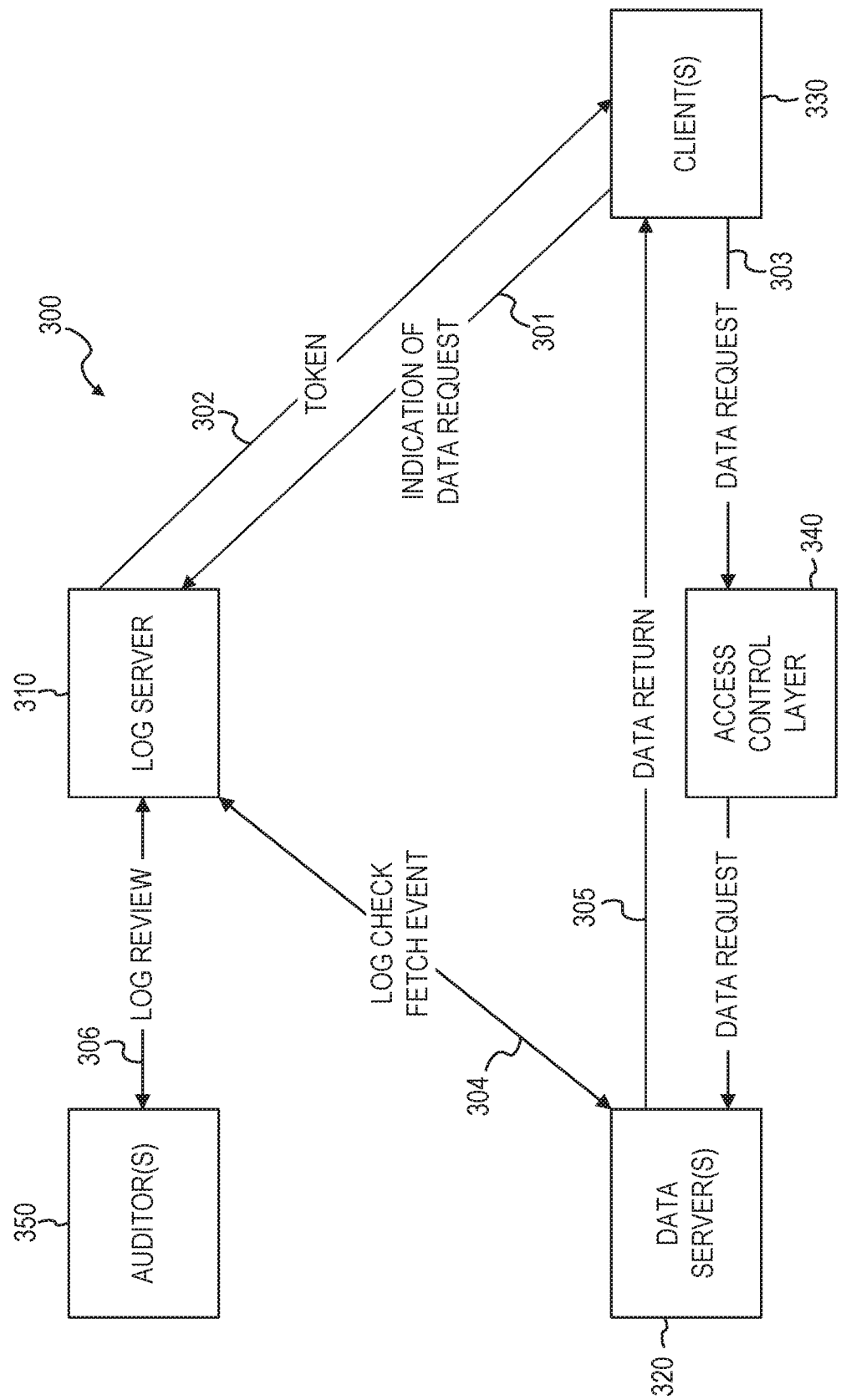
FIG. 3 is a block diagram illustrating an environment in which a logging system is implemented, in accordance with an example embodiment.

FIG. 3 is a block diagram illustrating an environment 300 in which the logging system 216 is implemented, in accordance with an example embodiment. In some example embodiments, the logging system 216 is configured to require each data access request to a data server, as well as the servicing by the data server of the data access request, to be logged in a way that makes the log auditable and tamper resistant.

In some example embodiments, the logging system 216 implements certificate transparency (CT), which is an open framework that is used to monitor and audit Secure Sockets Layer (SSL) certificates generated by certificate authorities. Using CT, the logging system 216 addresses certificate-based threats, such as compromised certificates or mis-issued certificates. The use of CT by the logging system 216 makes it extremely difficult for a certificate authority to issue an SSL certificate for a domain without the certificate being visible to the owner of that domain, provides an open auditing and monitoring system that lets any domain owner or certificate authority determine whether certificates have been mistakenly or maliciously issued, and protects users from being duped by certificates that were mistakenly or maliciously issued. In some example embodiments, a log server 310 keeps the log of any certificate issuance, and certificate monitors and auditors check the log server 310 to ensure the integrity of the certificate issuance logs. In some example embodiments, a certificate authority sends a log request of issuing a certificate to a domain to a log server, the log server responds to the request, the certificate authority issues the certificate to the domain, the domain verifies the certificate issuance, the log server responds to the verification request, and the clients interact with the domain using SSL.

In some example embodiments, the logging system 216 comprises any combination of one or more of the following components: a log server 310, one or more data servers 320, one or more clients 330, an access control layer 340, and one or more auditors 350. The components 310, 320, 330, 340, and 350 may each reside on a computer system, or other machine, having a memory and at least one processor (not shown), In some embodiments, one or more of the components 310, 320, 330, 340, and 350 can be incorporated into the networked system 102 in FIG. 1 (e.g., in the application server(s) 118 or in the database server(s) 124). However, it is contemplated that other configurations of the components 310, 320, 330, 340, and 350 are also within the scope of the present disclosure.

In some example embodiments, one or more of the components 310, 320, 330, 340, and 350 is configured to provide a variety of user interface functionality, such as generating one or more user interfaces that include information accessed from one or more log files manages by the logging system 216, which include non-routine and unconventional aspects or combinations of aspects, interactively presenting those user interfaces to the user, receiving information from the user (e.g., interactions with those user interfaces), and so on. Displaying, or otherwise presenting, information to the user can include causing display, or other presentation, of information to the user (e.g., communicating information to a device with instructions to display, or otherwise present, the information to the user). Information may be presented using a variety of means including visually displaying information and using other device outputs audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the components 310, 320, 330, 340, and 350 is configured to receive user input. For example, one or more of the components 310, 320, 330, 340, and 350 can present one or more GUI elements (e.g., drop-down menu, selectable buttons, text field) with which a user can submit input.

In some example embodiments, one or more of the components 310, 320, 330, 340, and 350 is configured to perform various communication functions to facilitate the functionality described herein, such as by communicating with the social networking system 210 via the network 104 using a wired or wireless connection. Any combination of one or more of the components 310, 320, 330, 340, and 350 may also provide various web services or functions, such as retrieving information from the third party servers 130 and the social networking system 210. Information retrieved by the any of the components 310, 320, 330, 340, and 350 may include profile data corresponding to users and members of the social networking service of the social networking system 210.

Additionally, any combination of one or more of the components 310, 320, 330, 340, and 350 can provide various data functionality, such as exchanging information with database(s) 340 or servers. For example; any of the components 310, 320, 330, 340, and 350 can access member profiles that include profile data from the database(s) 218 of FIG. 2, as well as extract attributes and/or characteristics from the profile data of member profiles. Furthermore, the one or more of the components 310, 320, 330, 340, and 350 can access social graph data and member activity and behavior data from databases 220 and 220 of FIG. 2, as well as exchange information with third party servers 130, client machines 110, 112, and other sources of information.

In some example embodiments, the data server 320 holds various pieces of data of users of an online service. The online service may comprise a social networking service (e.g., the social networking system 210 in FIG. 2) of which the users are members, and the data of the users may comprise one or more of profile data (e.g., name, work experience), browsing events or other behaviour (e.g., page views, interactions), and member messaging. However, other types of users, online services, and data are also within the scope of the present disclosure. The data server 320 answers data access requests from the clients 330.

In some example embodiments, the client 330 comprises a client device of an entity that requests data from the data server 320 in order to perform certain tasks. For example, the client 330 may comprise a data engineer requesting data from the data server 320 via a computing device in order to perform manual analysis on the requested data, an application on a computing device that consumes the requested data to provide functionality, or an algorithm running on a computing device that utilizes the requested data to generate machine learning models. Other types of clients 330 and client devices are also within the scope of the present disclosure.

In some example embodiments, the access control layer 340 provides identity and access management (JAM) functionality in implementing access control for interactions between the client(s) 330 and the data server(s) 320. The access control layer 340 may ensure that the proper clients 330 have the appropriate access to the data server(s) 320 by identifying, authenticating, and authorizing the clients 330 for access to the data server(s) 320.

In some example embodiments, the log server 310 enforces and stores data access logs, logging the data access events of every client request, such as the data requests issued by the clients 330 and the servicing of those data requests by the data servers 320. In some example embodiments, the log server 310 encrypts the log entries of the data access events, building in fine-grained attribute-based access policies into the encrypted log entries.

In some example embodiments, the auditors 350 are reviewer users who review the secure log managed by the log server 310 in order to ensure the integrity of the logs. The auditors 350 may comprise two different types of reviewer users: public reviewers, who do not have access to the plaintext of the log entries, and data owners, who do have access to the plaintext of the log entries. Public reviewers may verify the integrity of the log data so that they may ensure and attest that the log data is not modified or tampered with. Data owners can access the plaintext log entries that contain their personal data. In addition to verifying the integrity of the log entries, the data owners can further examine the log entries to confirm that the usage of their personal data does not violate the user agreement between the data owner and the online service from which the personal data is collected and accessed. In some example embodiments, the auditors 350 each comprise a computing device of an entity that requests access to the log files managed by the log server 310.

In some example embodiments of an operation flow within the environment 300 of FIG. 3, the client device 330 requests access to one or more pieces of data from one or more data servers 320 in the form of a data request in order to perform a data-related task. At operation 301, the client device 330 sends an indication of the data request, such as in the form of a request digest, to the log server 310 to ask for a request token. In some example embodiments, the log server 310 receives the indication of the data request from the client device 330. In some example embodiments, the data request issued by the client device 330 requests data of one or more users of an online service from the data server 320.

In response to, or otherwise based on, the receiving of the indication of the data request, the log server 310 stores a request log entry corresponding to the data request in a log file based on the received indication of the data request. In some example embodiments, the request log entry comprises any combination of one or more of a query of the data request that requests the data of the user(s) from the data server 320, a client identifier configured to uniquely identify a human user of the client device 330 or a software application of the client device 330, and a request timestamp indicating a time at which the data request was issued by the client device 330. In some example embodiments, the storing of the request log entry comprises encrypting data of the request log entry using an encryption algorithm, and storing the encrypted data of the request log entry in the log file.

In some example embodiments, in response to, or otherwise based on, the receiving of the indicating of the data request, the log server 310 generates a request token based on the received indication of the data request and transmits the generated request token to the client device 330, at operation 302. In some example embodiments, the generated request token comprises an encryption of the request log entry.

At 303, the client device 330 transmits the data request to the access control layer 340. In some example embodiments, the data request comprises a database query, such as a Structured Query Language (SQL) query or an Apache™ Hadoop® query, along with the request token received from the log server 310. The access control layer 340 may checks the client permissions (e.g., read and write permissions of the data sources, such as database table, Hadoop® files, etc.). Once the permission is granted by the access control layer 340, the data request is forwarded to the appropriate data server 320.

The data servers 320 serve the data request. However, before returning the requested data set to the client device 330, the data server 320 fetches a request digest corresponding to the request token from the log server 310 and compares it with the data request from the client device 330, at operation 304, in response to, or otherwise based on, receiving the data request from the client device 330. In some example embodiments, the request digest is configured to indicate whether or not the request log entry corresponding to the data request is stored in the log file when compared with the data request received from the client device 330. The data server 320 may process the request digest received from the log server 310 and the token received from the client device 330, such as by decrypting the request digest and the request token, and then compare the processed request digest and request token to determine if they match. At operation 305, the data server 320 responds to the data request based on the determination of whether the request digest matches the request token. If the request digest and the request token match, then data server 320 adds another log entry in the log server 310 as the response to the data request, which may include data identifier information, such as a user identification (ID) or an entity ID, and then returns the requested data to the client device 330. If the request digest and the request token do not match, then the data server 320 adds a reject log entry in the log server 310 and rejects the request.

In some example embodiments, the data server 320 transmits one or more instructions to the log server 310 for the log server 310 to add a response log entry as either a response to a data request indicating that the data request is successful (e.g., the requested data is provided by the data server 320 to the client device 330) or a response to the data request indicating that the data request is rejected (the requested data is not provided by the data server 320 to the client device 330). These instructions may be part of the fetch event at operation 304.

In some example embodiments, the response log entry stored by the log server 310 comprises any combination of one or more of a request identifier configured to uniquely identify the data request, one or more attributes that correspond to a response dataset for the data request, with the response dataset comprising the data of the user(s) that is requested by the client device from the data server via the data request, and a response timestamp indicating a time at which the data server responded to the data request. In some example embodiments, the response log entry further comprises a response status indicating whether or not the data request was successful in providing the data of the user to the client device 330 (e.g., whether the data server 320 provided the data of the user to the client device 330 or rejected the data request).

In some example embodiments, the storing of the response log entry comprises encrypting data of the response log entry using an encryption algorithm, and storing the encrypted data of the response log entry in the log file in the log server 310. The encryption algorithm used to encrypt the data of the response log entry may comprise an attribute-based encryption that builds an attribute-based access policy into cyphertext of the encrypted data of the response log entry. In some example embodiments, the attribute-based access policy is configured to allow decryption of the encrypted data only with a key that satisfies the attribute-based access policy. The attribute-based access policy may be based on one or more attributes of the response log entry.

In some example embodiments, the log server 310 encrypts each of the log entries it is storing and publishes them publicly so that anyone can verify their integrity. Based on the type of the logging requests, the log server 310 may perform different operations. For example, in some example embodiments, for a client logging request (e.g., the client device 330 requesting a token from the log server 310 for the data request), the log server 310 logs the request digest (e.g., the data request) and creates a token based on the request digest. For a server logging request (e.g., the data server 320 requesting the request digest from the log server 310 via the fetch event at operation 304), the log server 310 may log the response digest and create a ciphertext with built-in access policies for user or entity ID's using an attribute-based encryption algorithm.

In some example embodiments, the auditor(s) 350 may verify the integrity of the encrypted log entries by checking the consistency of a hash tree corresponding to the encrypted log entries. In addition, auditors 350 that are data owners can obtain a decryption key based on their attribute(s), such as their user or entity ID's, to further decrypt the log entries to validate the data usage compliance.

At operation 306, the log server 310 may receive a log review request from a computing device of a reviewer user to access information in the log file, determine a degree of access to information in the log file for the reviewer user based on one or more attributes of the reviewer user, and cause information corresponding to the response log entry stored in the log file to be displayed on the computing device of the reviewer user based on the determined degree of access for the reviewer user. In some example embodiments, the log review request comprises a query of the log file using one or more parameters on which to search the log file, such as searching the log file for log entries corresponding to one or more particular users, one or more clients associated with the data requests represented in the log files, and time parameters corresponding to the log entries. Other parameters for the query are also within the scope of the present disclosure.

In some example embodiments, the logging system 216 comprises log ledger generation and log ledger encryption. The logging system 216 may use cryptographic hash functions to verify the integrity of data. Because a cryptographic hash function is a one-way function, the hash result of a piece of data is infeasible to forge without knowing the original data. To verify the integrity of a sequence of data, the hash results are chained together and the final result serves as the integrity evidence.

In some example embodiments, the logging system 216 implements the generation of a log ledger, such as the log file managed by the log server 310, using two processes: a log generation process and a request token verification process. In some example embodiments, the logging system 216 performs the log generation process for both request log entries and response log entries. As shown below, a request log entry (RequestLog) may comprise the data access query detail of a data request (Req), an identifier of the client device 330 (Client$_{id}$), such as a user name or an application name associated with the client device 330, and a timestamp indicating when the request is issued (t):

$$RequestLog=(Req\|Client_{id}\|t).$$

A response log entry (ResponseLog) may comprise a request II) ($Req_{id}$), and a list of attributes associate with the response dataset ($Attr_i$ . . . $Attr_j$), the response time (i), and the response status (e.g., "SUCCEED" or "REJECTED").

$$ResponseLog=(Req_{id}\|\{Attr_i \ldots Attr_j\}\|t).$$

The attributes may comprise unique identifiers such as user ID or geographic information (e.g., zip code).

In some example embodiments, the request token verification comprises three algorithms: a setup algorithm, a request token generation algorithm, and a request token verification algorithm. In the setup algorithm, the logging system 216 chooses a pair of (pk, sk) and a cryptographic hash function H. The logging system 216 then publicly announces pk and H. In the request token generation algorithm, when the logging system 216 receives a data request, it generates a request token $Req_{token}$ as:

$$Req_{token}=Req_{id}\|Req_{signature},$$

where $Req_{signature}=H(Req\|Client_{id}\|t)_{sig}$.

In the request token verification algorithm, when the data server 320 receives the data request from the client device 330 and the request token from the log server 310, such as the request detail of $Req_{id}$, the logging system 216 (e.g., the data server 320) verities that the signature matches:

$$H(Req\|Client_{id}\|t)=?Dec_{pk}(Req_{signature}).$$

If they match, then the data is returned by the data server 320, and a response log entry with status SUCCEED is logged into the logging system 216 (e.g., into the log file of the log server 310). If they do not match, then only a response log entry with status REJECTED is inserted into the logging system 216.

Figure 4:
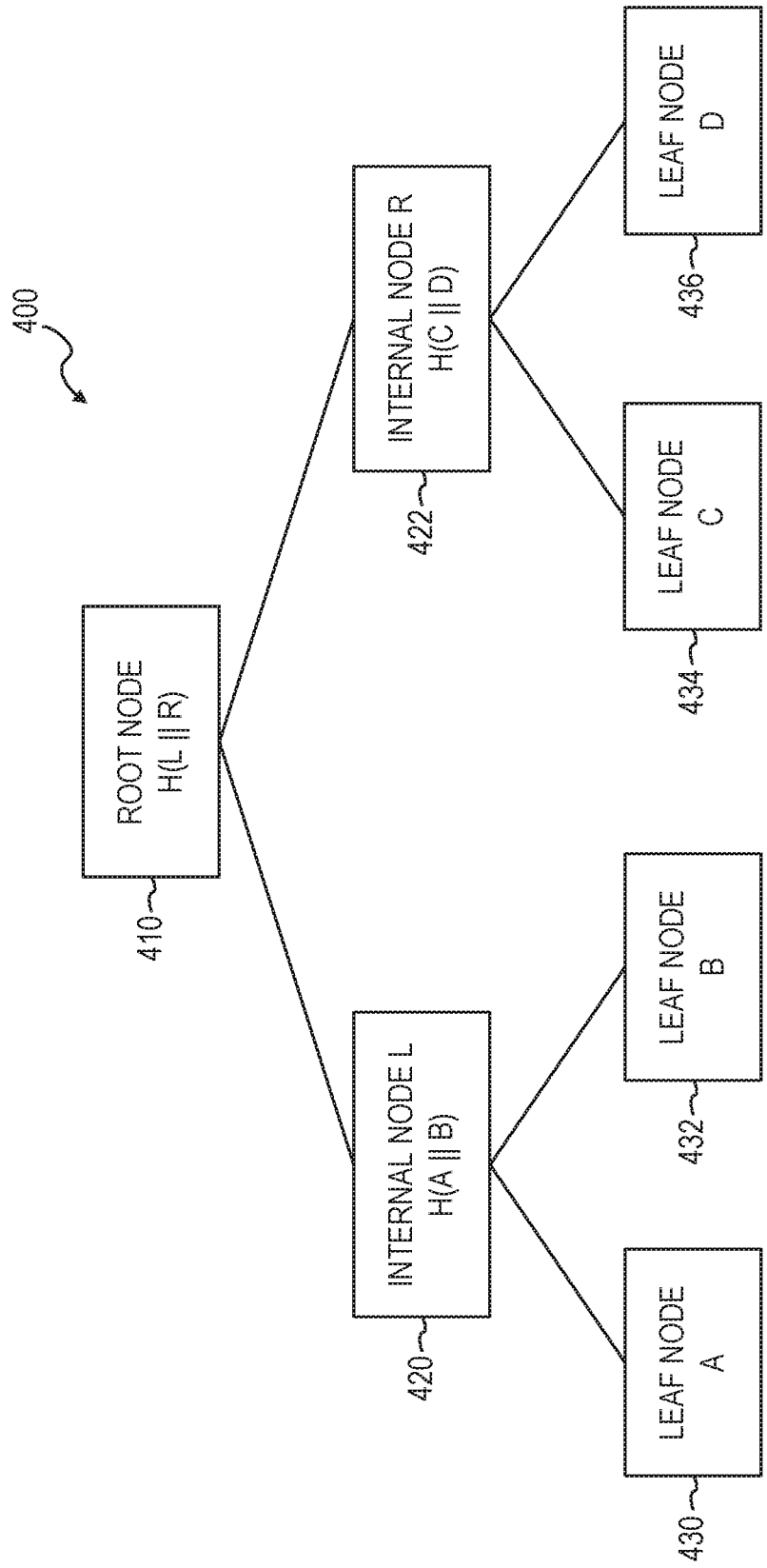
FIG. 4 illustrates a Merkle hash tree, in accordance with an example embodiment.

In some example embodiments, log entries in the logging system 216 are organized into a Merkle hash tree of which the leaf nodes are the request and response log entries based on their time sequence. FIG. 4 illustrates a Merkle hash tree 400, in accordance with an example embodiment. In FIG. 4, the Merkle hash tree 400 comprises a root node 410, internal nodes 420 and 422 that are children of the root node 410, and leaf nodes 430, 432, 434, and 436 that are children of the internal nodes 420 and 422, respectively. A Merkle hash tree 400 may comprise a binary tree structure of which each internal tree node is a hash result of its left and right children. A Merkle hash tree is an efficient data structure that may be used to verify contents of large data structures compared with a hash chain. For example, if a verifier (e.g., an auditor 350) wants to verify whether the current hash result properly includes the data B (e.g., the content as well as the sequence order of data B), the verifier needs to compute the hash value of the route from the leaf node B to the root node. In FIG. 4, the root node 410 is the hash value of its children nodes 420 and 422, and the internal nodes 420 and 422 are the hash values of their respective children nodes 430, 432, 434, and 436. Because each internal node value is the hash of its children, the verifier only needs the values of the sibling nodes. In FIG. 4, they are A and R, compared with the traditional hash chain, where the verifier needs all the subsequent nodes which are C and D. Therefore, the integration verification computation complexity of a Merkle hash tree for a dataset of size N is O(log N), while the integration verification computation complexity is O(N) for a tradition hash chain.

Figure 5:
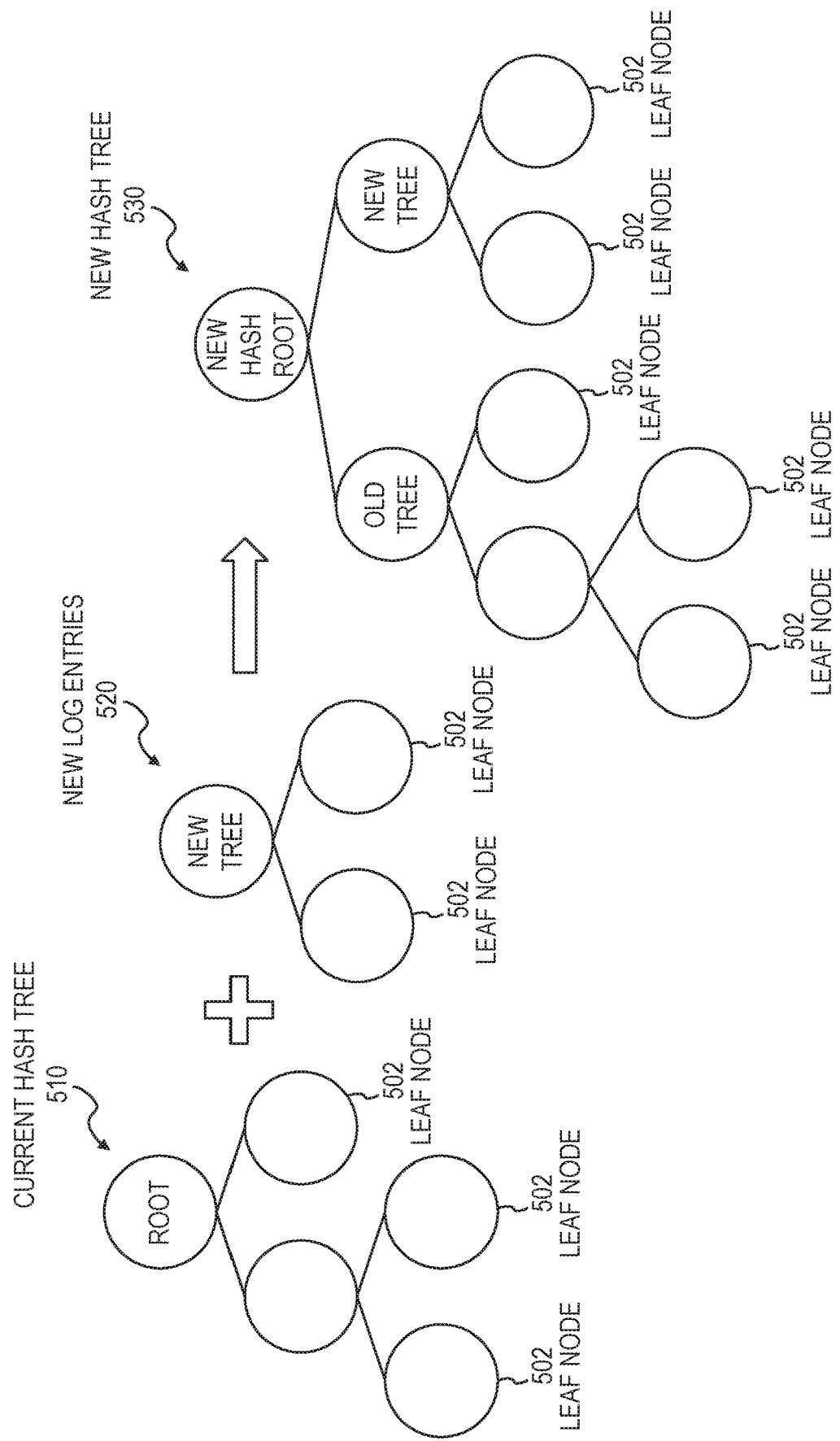
FIG. 5 illustrates new log entries merged with a current Merkle hash tree to form a new Merkle hash tree, in accordance with an example embodiment.

Periodically, newly inserted log entries s are organized into a new Merkle hash tree which is merged with the existing Merkle tree. FIG. 5 illustrates new log entries 520 of a new Merkle hash tree merged with a current Merkle hash tree 510 to form a new Merkle hash tree 530, in accordance with an example embodiment. Each of these trees 510, 520, and 530 comprises respective leaf nodes 502.

In some example embodiments, before the log entries are made available to the public, the logging system 216 encrypts them to ensure privacy protection. Response log entries may comprise the attributes of the returned data set for a particular request, while request log entries may comprise only the data request. Therefore, in some example embodiments, the logging system 216 uses different encryption algorithms for different types of log entries.

As a response log entry is created only when a data request is served, in some example embodiments, the logging system 216 provides flexible policy-based encryption to response log entries only and retrieves the associated request only when a user has the access to a response. As previously discussed, a response log entry may comprise the following form $$ResponseLog=(Req_{id}\|\{Attr_i \ldots Attr_j\}\|t).$$

Based on the attribute, the logging system 216 may encrypt the log entry with an attribute-based encryption algorithm.

Attribute-based encryption is a type of public key encryption algorithm. Unlike the traditional public key cryptographic algorithms like Rivest-Shamir-Adleman (RSA), which only has one public key and secret key pair, in some example embodiments of the logging system 216, the concept of attributes is built into the ciphertext and key generation process. For example, the ciphertext of a log file using attribute-based encryption is associated with a set of attributes, such as the timestamp when the log is generated, the application owner of the log file, or the log event level. A decryption policy can be enforced based on an attribute policy rule.

Correspondingly, different people who would like to access the data may be given a different set of attributes based on their privileges. In one example, the decryption policy can be OWNER OR LOG_LEVEL:ERROR, which means that either the owner of the log file or someone with the access to the error log can decrypt the file.

In ciphertext-policy attribute-based encryption (CP-ABE), the encryption algorithm builds an attribute-based access policy into the ciphertext (e.g., the ciphertext can be decrypted only with keys that match the access policy). An access policy may be organized as a tree structure. Each non-leaf node of the tree may be represented by a polynomial, while leaf nodes may be associated with an attribute. The polynomial representation of a non-leaf sub-tree may be evaluated to 1 given a set of attributes R only when R satisfies the access policies of all its children.

Figure 6:
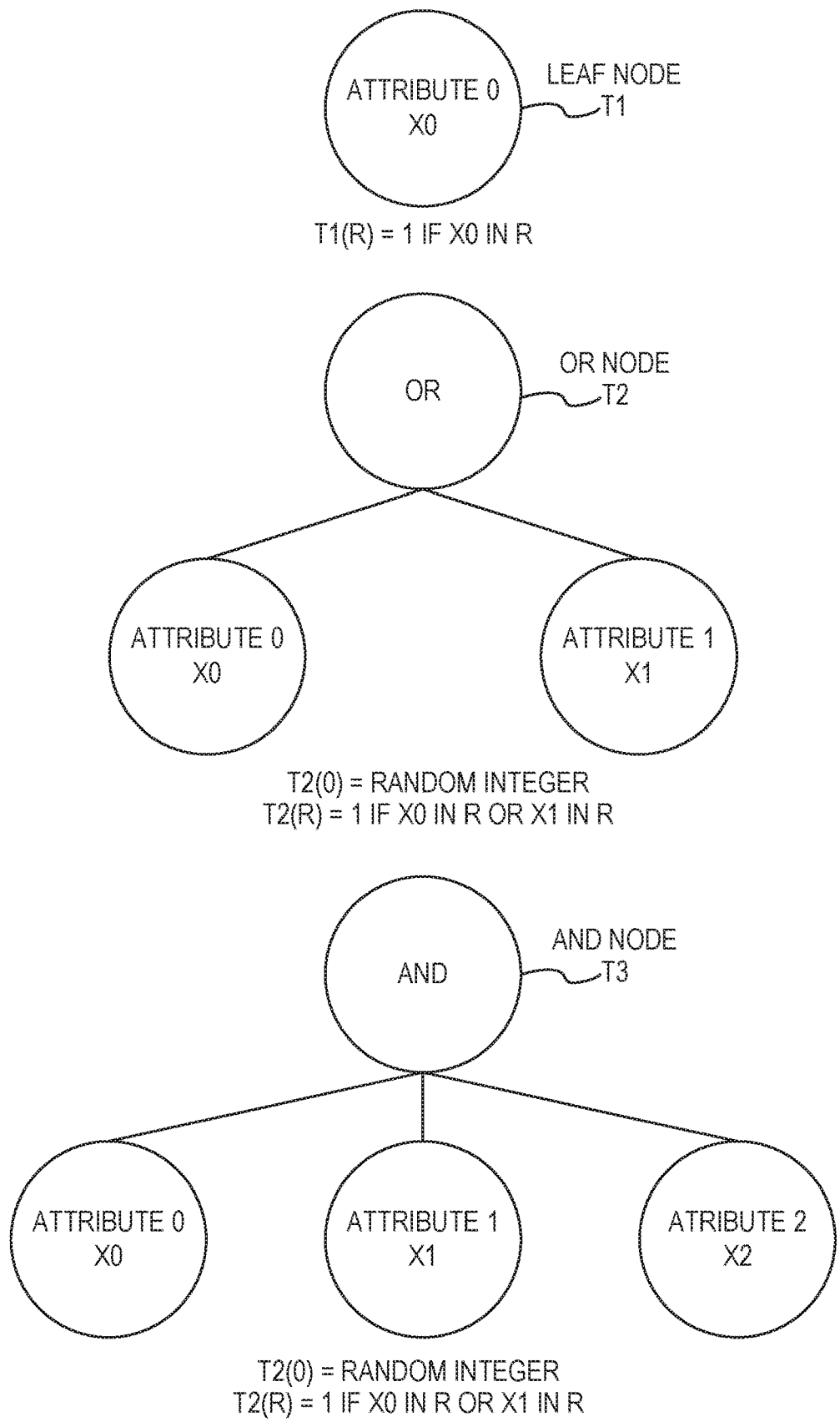
FIG. 6 is a conceptual diagram of an access policy organized as a tree structure, in accordance with an example embodiment.

FIG. 6 is a conceptual diagram of an access policy organized as a tree structure, in accordance with an example embodiment. In FIG. 6, a leaf node T1 is an attribute, and thus, is represented as a constant, An OR node T2 is represented as a polynomial with a degree of 1, and an AND node T3 is represented as a polynomial with a degree of k−1, where k is the number of its children.

The CP-ABE algorithm is based on a Bilinear Map, which satisfies the following properties. Let $G_0$ and $G_1$ be two multiplicative cyclic groups of prime order p. Let g be a generator of $G_0$ and e be a bilinear map, e: $G_0 \times G_0 \rightarrow G_1$. The bilinear map e has the following properties:

Bilinearity: for all $u,v \in G_0$ and $a,b \in Z_p$, we have $e(u^a,v^b) \in e(u,v)^{ab}$; and Non-degeneracy: $e(g,g) \neq 1$.

In some example embodiments, the response log encryption has two algorithms: a setup algorithm and a log encryption algorithm. In the setup algorithm, the log server 310 selects a bilinear group $G_0$ of prime order p with generator g, and then selects two random exponents $a,b \in Z_p$. The public key may be published as a 5-tuple:

$PK = G_0, g, h = g^b, g = g^{1/b}, e(g,g)^a$.

In some example embodiments, the log encryption algorithm comprises, given a log entry, an attribute set associated with the log entry, and the access policy tree, the log server 310 computes the following as the ciphertext (CT):

$CT = (T, C_1 = Me(g,g)^{as}, C_2 = h^s, \{Enc(Attr_0), \ldots, Enc(Attr_n)\}, s \in Z$, where $Enc(Attr_i)$ is to encrypt each of the attribute of the access policy tree.

In some example embodiments, when a user attempts to decrypt a ciphertext of a response log, two algorithms are used: a key generation algorithm and a log decryption algorithm. In the key generation algorithm, the log server generates a master secret key for a superset of attributes S:

$SK = (D = g^{a+r)/b}, \forall j \in S: D_j = g^r \cdot H(j)^{r_j}, E_j = g^{r_j})$, where r, $r_j$ are random integers and H is a cryptographic hash function. Then, given the attribute set S' of a user, which may be a subset of the superset, the log server 310 selects a random integer r' and a set of random integers $r'_j$ for $\forall k_j \in S'$, and outputs the user's decryption key as MemberSK=$(D'=D \cdot g^{r'}, \forall k \in S': D'_k = D_k \cdot g^{r'} \cdot H(k)^{r'_k}, E'_k = E_k \cdot g^{r'_k})$.

In the log decryption algorithm, for a leaf node x, a computing device of the user performs the following computation:

DecryptLeaf(CT,MemberSK,$x$)=$e(D_i, C_x)/e(D'_i, C'_x)$.

For a non-leaf node x, the computing device of the user performs the following computation:

DecryptNode(CT,MemberSK,$x$)=
$\Pi_{k \in x'\_children}$DecryptNode(CT,MemberSK,$k$).

Based on the bilinear properties for the group that is selected, the final output from DecryptNode will be $e(g,g)^{rs}$. Therefore, the plaintext of the response log entry can be computed as follows:

$C_1/(e(C,D)/$DecryptNode(CT,MemberSK,root))=$C_1/(e(h^s, g^{(a+r)/b})/e(g,g)^{rs}) = M$.

In the data access application scenario, request log entries are less sensitive compared with the response log entries. Therefore, in some example embodiments, the logging system 216 does not provide fine-grained access policy for request log entries. Instead, symmetric encryption algorithms, such as the advanced encryption standard (AES), may be used to encrypt request log entries. Meanwhile, each response log entry may be associated with one request log entry. When a user reviews the data accessing log entry, the logging system 216 reveal both the response log entries along with their associated request log entries to the user only. Therefore, in some example embodiments, the encryption key for request log entries must be derived from the respective response log entry. In order to achieve the above Objective, in some example embodiments, the logging system 216 includes the encryption key of a request log entry into the plaintext of a response log entry. Once a user decrypts a response log entry, the included key can be used to decrypt the corresponding request log entry.

In some example embodiments, the attribute set of a user may change when the user is granted or revoked certain attributes. When attributes are removed from a user, the previous generated user secret keys may not be able to decrypt new log entries containing the attributes, thereby providing forward secrecy. Users who are granted new attributes may not be able to use their keys to decrypt old response log entries, therefore providing backward secrecy.

In some example embodiments, the logging system 216 provides both forward and backward secrecy. One way of achieving this objective is to re-encrypt the log entries. However, this solution faces a scalability issue when it comes to modern enterprise applications. Since most current Internet applications/services have well-maintained user credential management systems, in some example embodiments, the logging system 216 delegates the key management task to the same system, with the approach being to manage the user secret keys at the server side alongside the existing credentials and delete or revoke the keys that should no longer be used.

Figure 7:
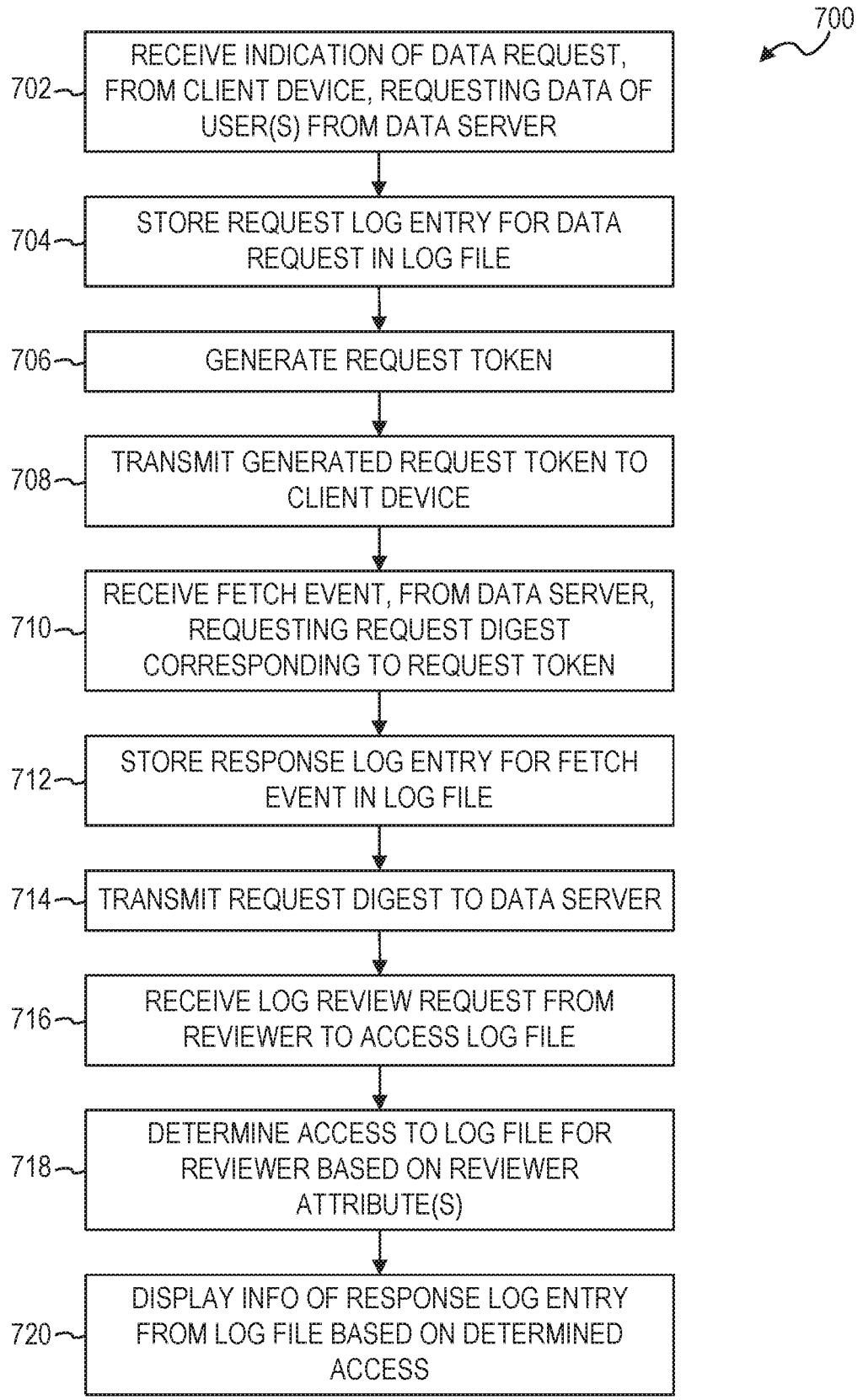
FIG. 7 is a flowchart illustrating a method of implementing a secure and verifiable data access logging system, in accordance with an example embodiment.

FIG. 7 is a flowchart illustrating a method of implementing a secure and verifiable data access logging system, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the log server 310 of FIG. 3, as described above.

At operation 702, the log server 310 receives an indication of a data request from a client device. In some example embodiments, the data request requests data of one or more users of an online service from a data server. The indication of the data request may comprise contents of the data request itself. For example, the indication of the data request may comprise one or more query statements of the data request. The indication of the data request may comprises other data as well, including, but not limited to, a timestamp indicating a time at which the data request is issued and an identifier associated with the client device, such as an identifier of a human user that is using the client device or an identifier of an application running on the client device.

At operation 704, the log server 310 stores a request log entry corresponding to the data request in a log file based on the receiving of the indication of the data request. In some example embodiments, the request log entry comprises any combination of one or more of a query of the data request that requests the data of the user(s) from the data server, a client identifier configured to uniquely identify a human user of the client device or a software application of the client device, and a request timestamp indicating a time at which the data request was issued by the client device. In some example embodiments, the storing of the request log entry comprises encrypting data of the request log entry using an encryption algorithm and storing the encrypted data of the request log entry in the log file.

At operation 706, the log server 310 generates a request token based on the received indication of the data request. The generation of the request token may be performed in response to, or otherwise based on, the receiving of the indication of the data request. In some example embodiments, the generated request token comprises an encryption of the request log entry. For example, as previously discussed, in some example embodiments, the request token $\text{Req}_{token}$ is represented as:

$$\text{Req}_{token} = \text{Req}_{id} \| \text{Req}_{signature},$$

where $\text{Req}_{signature} = (\text{Req} \| \text{Client}_{id} \| t)_{sig}$.

However, other forms of the generated request token are also within the scope of the present disclosure.

At operation 708, the log server 310 transmits the generated request token to the client device. In some example embodiments, the log server 310 transmits the generated request token to the client device in response to, or otherwise based on, the generation of the request token.

At operation 710, the log server 310 receives a fetch event from the data server. In some example embodiments, the fetch event requests a request digest corresponding to the request token. The fetch event may correspond to a transmission of the data request from the client device to the data server. In some example embodiments, the request digest is configured to indicate that the request log entry corresponding to the data request is stored in the log file.

At operation 712, the log server 310 stores a response log entry, corresponding to the received fetch event based on the receiving of the fetch event. In some example embodiments, the response log entry comprises any combination of one or more of a request identifier configured to uniquely identify the data request, one or more attributes that correspond to a response dataset for the data request, with the response dataset comprising the data of the user(s) that is requested by the client device from the data server via the data request, and a response timestamp indicating a time at which the data server responded to the data request. In some example embodiments, the response log entry further comprises a response status indicating whether the data request was successful in providing the data of the user to the client device. In some example embodiments, the storing of the response log entry comprises encrypting data of the response log entry using an encryption algorithm and storing the encrypted data of the response log entry in the log file. In some example embodiments, the encryption algorithm used to encrypt the data of the response log entry comprises an attribute-based encryption that builds an attribute-based access policy into cyphertext of the encrypted data of the response log entry, with the attribute-based access policy being configured to allow decryption of the encrypted data only with a key that satisfies the attribute-based access policy, and the attribute-based access policy being based on the one or more attributes of the response log entry.

At operation 714, the log server 310 transmits the request digest to the data server in response to, or otherwise based on, the received fetch event. In some example embodiments, the data server then uses the request digest as a basis for returning the requested data of the user to the client device.

At operation 716, the log server 310 receives a log review request from a computing device of a reviewer user to access information in the log file. In some example embodiments, the log review request comprises one or more parameters configured to be used in a search of the log file to provide the results of the search to the reviewer user. For example, the log review request may comprise one or more user identifiers that identify one or more user to determine any data requests corresponding to the one or more users that have been serviced by the data server, one or more time parameters to determine any data requests that have been serviced by the data server within the one or more time parameters, or one or more topics to determine any data requests corresponding to the one or more topics that have been serviced by the data server.

At operation 718, the log server 310 determines a degree of access to information in the log file for the reviewer user based on one or more attributes of the reviewer user. For example, as previously discussed, the reviewer user may comprise two different types of reviewer users: public reviewers, who do not have access to the plaintext of the log entries, and data owners, who do have access to the plaintext of the log entries. Public reviewers may verify the integrity of the log data so that they may ensure and attest that the log data is not modified or tampered with. Data owners can access the plaintext log entries that contain their personal data. In addition to verifying the integrity of the log entries, the data owners can further examine the log entries to confirm that the usage of their personal data does not violate the user agreement between the data owner and the online service from which the personal data is collected and accessed.

At operation 720, the log server 310 causes information corresponding to the response log entry stored in the log file to be displayed on the computing device of the reviewer user based on the determined degree of access for the reviewer user. For example, the information corresponding to the response log entry may be displayed as search results on the computing device of the reviewer user.

It is contemplated that any of the other features described within the present disclosure can be incorporated into the method 700.

Figure 8:
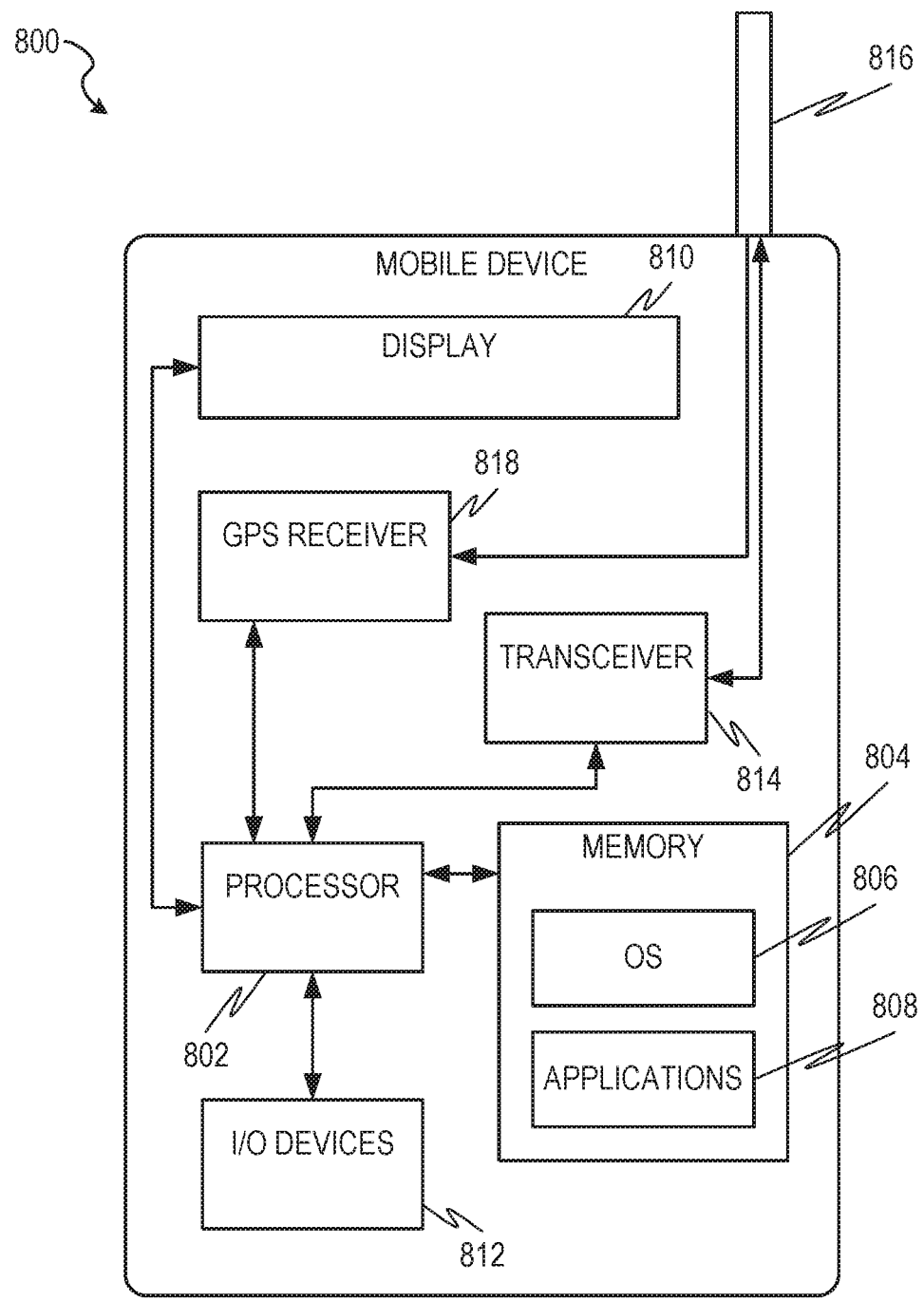
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially, processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
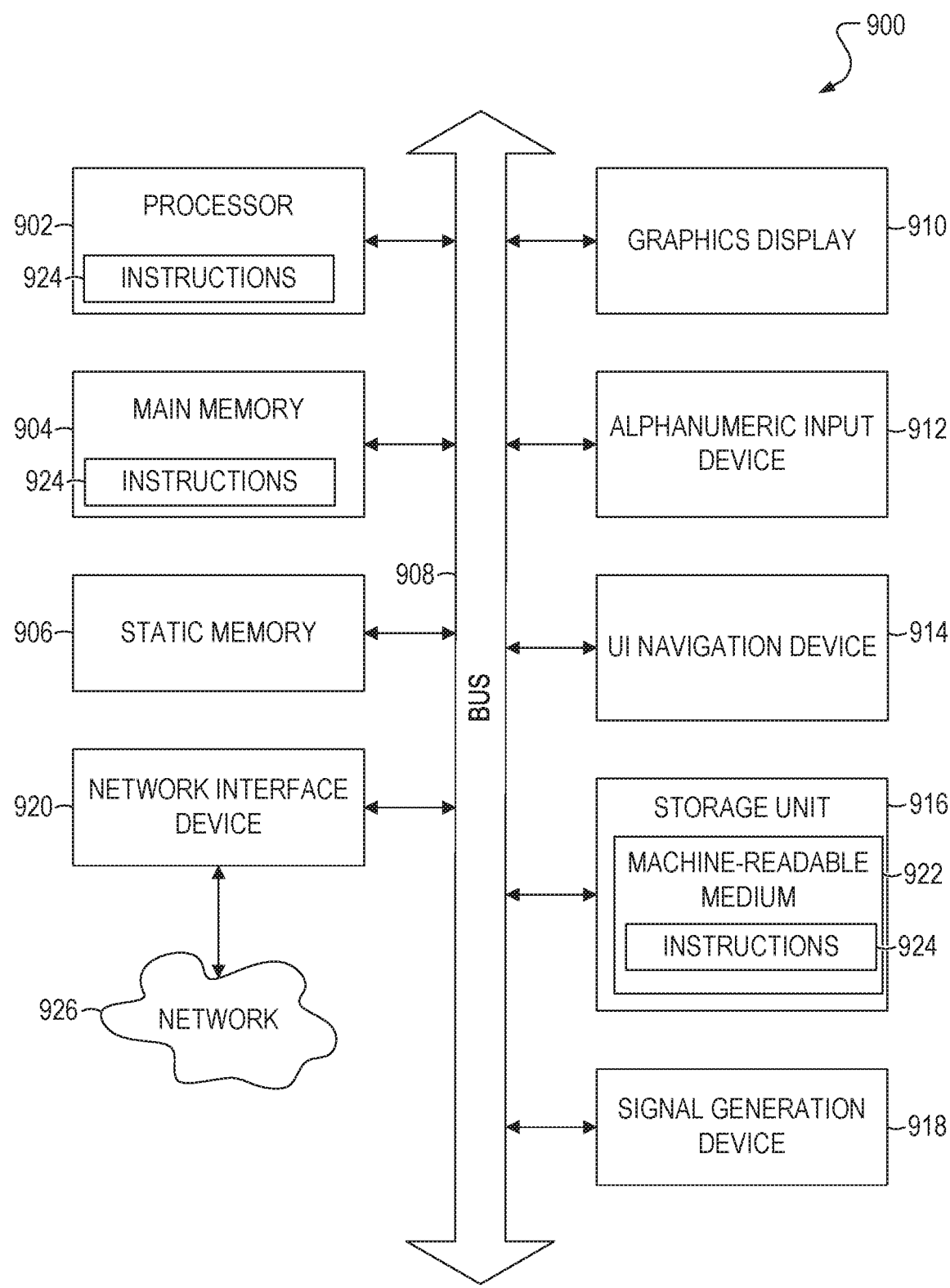
FIG. 9 is a block diagram of an example computer system on which methodologies described herein may be executed, in accordance with an example embodiment.

FIG. 9 is a block diagram of an example computer system 900 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a graphics display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a storage unit 916, a signal generation device 918 (e.g., a speaker) and a network interface device 920.

The storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions (e.g., instructions 924) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.

1. A computer-implemented method comprising:
   receiving, by a log server having a memory and at least one hardware processor, an indication of a data request from a client device, the data request requesting data of one or more users of an online service from a data server;
   storing, by the log server, a request log entry corresponding to the data request in a log file based on the receiving of the indication of the data request;
   generating, by the log server, a request token based on the received indication of the data request;
   transmitting, by the log server, the generated request token to the client device;
   receiving, by the log server, a fetch event from the data server, the fetch event requesting a request digest corresponding to the request token, the fetch event corresponding to a transmission of the data request from the client device to the data server; and the request digest being configured to indicate that the request log entry corresponding to the data request is stored in the log file;
   storing, by the log server, a response log entry corresponding to the received fetch event in the log file based on the receiving of the fetch event; and
   transmitting, by the log server, the request digest to the data server based on the received fetch event.

2 The computer-implemented method of example 1, wherein the generated request token comprises an encryption of the request log entry.

3. The computer-implemented method of example 1 or example 2, wherein the request log entry comprises:
   a query of the data request, the query requesting the data of the one or more users from the data server;
   a client identifier configured to uniquely identify a human user of the client device or a software application of the client device; and
   a request timestamp indicating a time at which the data request was issued by the client device.

4. The computer-implemented method of any one of examples 1 to 3, wherein the storing of the request log entry comprises:
   encrypting data of the request log entry using an encryption algorithm; and
   storing the encrypted data of the request log entry in the log file 5. The computer-implemented method of any one of examples 1 to 4, wherein the response log entry comprises:
   a request identifier configured to uniquely identify the data request;
   one or more attributes that correspond to a response dataset for the data request, the response dataset comprising the data of the one or more users that is requested by the client device from the data server via the data request; and a response timestamp indicating a time at which the data server responded to the data request.

6. The computer-implemented method of any one of examples 1 to 5, wherein the response log entry further comprises a response status indicating whether the data request was successful in providing the data of the user to the client device.

7. The computer-implemented method of any one of examples 1 to 6, wherein the storing of the response log entry comprises:
encrypting data of the response log entry using an encryption algorithm; and
storing the encrypted data of the response log entry in the log file.

8. The computer-implemented method of any one of examples 1 to 7, wherein the encryption algorithm used to encrypt the data of the response log entry comprises an attribute-based encryption that builds an attribute-based access policy into cyphertext of the encrypted data of the response log entry, the attribute-based access policy configured to allow decryption of the encrypted data only with a key that satisfies the attribute-based access policy, and the attribute-based access policy based on the one or more attributes of the response log entry.

9. The computer-implemented method of example 8, further comprising:
receiving, by the log server, a log review request from a computing device of a reviewer user to access information in the log file;
determining, by the log server, a degree of access to information in the log the for the reviewer user based on one or more attributes of the reviewer user; and
causing, by the log server, information corresponding to the response log entry stored in the log file to be displayed on the computing device of the reviewer user based on the determined degree of access for the reviewer user.

10. A system comprising:
at least one processor; and
a non-transitory computer-readable medium storing executable instructions that, when executed, cause the at least one processor to perform the method of any one of examples 1 to 9.

14. A non-transitory machine-readable storage medium, tangibly embodying a set of instructions that, when executed by at least one processor, causes the at least one processor to perform the method of any one of examples 1 to 9.

15. A machine-readable medium carrying a set of instructions that, when executed by at least one processor, causes the at least one processor to carry out the method of any one of examples 1 to 9.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
receiving, by a log server having a memory and at least one hardware processor, an indication of a data request from a client device; the data request requesting data of one or more users of an online service from a data server;
storing; by the log server, a request log entry corresponding to the data request in a log file based on the receiving of the indication of the data request;
generating, by the log server, a request token based on the indication of the data request;
transmitting, by the log server, the request token to the client device;
receiving, by the log server, a fetch event from the data server, the fetch event requesting a request digest corresponding to the request token, the fetch event corresponding to a transmission of the data request from the client device to the data server, and the request digest being configured to indicate that the request log entry corresponding to the data request is stored in the log file;
storing, by the log server, a response log entry corresponding to the fetch event in the log file based on the receiving of the fetch event; and
transmitting, by the log server, the request digest to the data server based on the fetch event.

2. The computer-implemented method of claim 1, wherein the request token comprises an encryption of the request log entry.

3. The computer-implemented method of claim 1, wherein the request log entry comprises:
a query of the data request, the query requesting the data of the one or more users from the data server;
a client identifier configured to uniquely identify a human user of the client device or a software application of the client device; and
a request timestamp indicating a time at which the data request was issued by the client device.

4. The computer-implemented method of claim 1, wherein the storing of the request log entry comprises:
encrypting data of the request log entry using an encryption algorithm; and
storing the encrypted data of the request log entry in the log file.

5. The computer-implemented method of claim 1, wherein the response log entry comprises:
a request identifier configured to uniquely identify the data request;
one or more attributes that correspond to a response dataset for the data request, the response dataset comprising the data of the one or more users that is requested by the client device from the data server via the data request; and a response timestamp indicating a time at which the data server responded to the data request.

6. The computer-implemented method of claim 5, wherein the response log entry further comprises a response status indicating whether the data request was successful in providing the data of the user to the client device.

7. The computer-implemented method of claim 1, wherein the storing of the response log entry comprises:

encrypting data of the response log entry using an encryption algorithm; and storing the encrypted data of the response log entry in the log file.

8. The computer-implemented method of claim 7, wherein the encryption algorithm used to encrypt the data of the response log entry comprises an attribute-based encryption that builds an attribute-based access policy into cyphertext of the encrypted data of the response log entry, the attribute-based access policy configured to allow decryption of the encrypted data only with a key that satisfies the attribute-based access policy, and the attribute-based access policy based on the one or more attributes of the response log entry.

9. The computer-implemented method of claim 8, further comprising:

receiving, by the log server, a log review request from a competing device of a reviewer user to access information in the log file;

determining, by the log server, a degree of access to information in the log file for the reviewer user based on one or more attributes of the reviewer user; and causing, by the log server, information corresponding to the response log entry stored in the log file to be displayed on the computing device of the reviewer user based on the degree of access for the reviewer user.

10. A system comprising:

at least one hardware processor; and a non-transitory machine-readable medium embodying a set of instructions that, when executed by the at least one hardware processor, cause the at least one processor to perform operations, the operations comprising:

receiving an indication of a data request from a client device, the data request requesting data of one or more users of an online service from a data server;

storing a request log entry corresponding to the data request in a log file based on the receiving of the indication of the data request;

generating a request token based on the indication of the data request;

transmitting the request token to the client device;

receiving a fetch event from the data server, the fetch event requesting a request digest corresponding to the request token, the fetch event corresponding to a transmission of the data request from the client device to the data server; and the request digest being configured to indicate that the request log entry corresponding to the data request is stored in the log file;

storing a response log entry corresponding to the fetch event in the log file based on the receiving of the fetch event; and transmitting the request digest to the data server based on the fetch event.

11. The system of claim 10, wherein the request token comprises an encryption of the request log entry.

12. The system of claim 10, wherein the request log entry comprises:

a query of the data request, the query requesting the data of the one or more users from the data server;

a client identifier configured to uniquely identify a human user of the client device or a software application of the client device; and a request timestamp indicating a time at which the data request was issued by the client device.

13. The system of claim 10; wherein the storing of the request log entry comprises:

encrypting data of the request log entry using an encryption algorithm; and storing the encrypted data of the request log entry in the log file.

14. The system of claim 10, wherein the response log entry comprises:

a request identifier configured to uniquely identify the data request;

one or more attributes that correspond to a response dataset for the data request, the response dataset comprising the data of the one or more users that is requested by the client device from the data server via the data request; and a response timestamp indicating a time at which the data server responded to the data request.

15. The system of claim 14, wherein the response log entry further comprises a response status indicating whether the data request was successful in providing the data of the user to the client device.

16. The system of claim 10, wherein the storing of the response log entry comprises:

encrypting data of the response log entry using an encryption algorithm; and storing the encrypted data of the response log entry in the log file.

17. The system of claim 16, wherein the encryption algorithm used to encrypt the data of the response log entry comprises an attribute-based encryption that builds an attribute-based access policy into cyphertext of the encrypted data of the response log entry, the attribute-based access policy configured to allow decryption of the encrypted data only with a key that satisfies the attribute-based access policy, and the attribute-based access policy based on the one or more attributes of the response log entry.

18. The system of claim 17, wherein the operations further comprise:

receiving a log review request from a computing device of a reviewer user to access information in the log file;

determining a degree of access to information in the log file for the reviewer user based on one or more attributes of the reviewer user; and causing information corresponding to the response log entry stored in the log file to be displayed on the computing device of the reviewer user based on the determined degree of access for the reviewer user.

19. A non-transitory machine-readable medium embodying a set of instructions that, when executed by at least one hardware processor, cause the processor to perform operations, the operations comprising:

receiving an indication of a data request from a client device, the data request requesting data of one or more users of an online service from a data server;

storing a request log entry corresponding to the data request in a log file based on the receiving of the indication of the data request;

generating a request token based on the indication of the data request;

transmitting the generated request token to the client device;

receiving a fetch event from the data server, the fetch event requesting a request digest corresponding to the request token, the fetch event corresponding to a transmission of the data request from the client device to the data server, and the request digest being configured to indicate that the request log entry corresponding to the data request is stored in the log file;

storing a response log entry corresponding to the fetch event in the log file based on the receiving of the fetch event; and transmitting the request digest to the data server based on the fetch event.

20. The non-transitory machine-readable medium of claim 19, wherein the request log entry comprises:

a query of the data request, the query requesting the data of the one or more users from the data server;

a client identifier configured to uniquely identify a human user of the client device or a software application of the client device; and a request timestamp indicating a time at which the data request was issued by the client device.

* * * * *

UNITED STATES PATENT AND TRADEMARK OFFICE
CERTIFICATE OF CORRECTION

PATENT NO. : 11,032,071 B2  
APPLICATION NO. : 16/369335  
DATED : June 8, 2021  
INVENTOR(S) : Bing Wang and Neil Scott Davenport Page 1 of 1

It is certified that error appears in the above-identified patent and that said Letters Patent is hereby corrected as shown below:

In the Claims

Column 23  
Claim 9: Line 29: Delete "competing" and insert --computing--.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*